US006983157B2

(12) United States Patent
Yamagishi et al.

(10) Patent No.: US 6,983,157 B2
(45) Date of Patent: Jan. 3, 2006

(54) AUTOMATIC REPORT CONTROL SYSTEM FOR REPORTING ARRIVAL AT DESTINATION OR PASSING POINT

(75) Inventors: Norikazu Yamagishi, Yokohama (JP); Takaaki Habara, Yokohama (JP); Mutsuharu Takesada, Yokohama (JP)

(73) Assignee: Hitachi Electronic Service Co., Ltd., Kanagawa (JP)

( * ) Notice: Subject to any disclaimer, the term of this patent is extended or adjusted under 35 U.S.C. 154(b) by 346 days.

(21) Appl. No.: 10/338,075

(22) Filed: Jan. 7, 2003

(65) Prior Publication Data

US 2004/0203932 A1 Oct. 14, 2004

(30) Foreign Application Priority Data

Jun. 11, 2002 (JP) .............................. 2002-170099

(51) Int. Cl.
H04Q 7/20 (2006.01)
(52) U.S. Cl. ...................... 455/457; 455/440; 455/424; 455/404.1; 455/405; 455/11.1; 342/357.07; 342/357.06; 342/357.13; 701/213; 701/210
(58) Field of Classification Search ................ 455/457, 455/440, 424, 404.1, 414.1, 405, 11.1; 701/213, 701/210; 342/357.07, 357.06, 357.13
See application file for complete search history.

(56) References Cited

U.S. PATENT DOCUMENTS

| 5,805,055 | A | * | 9/1998 | Colizza ................. 340/426.25 |
| 5,808,565 | A | * | 9/1998 | Matta et al. ................. 340/994 |
| 6,381,533 | B1 | * | 4/2002 | Crane et al. ................. 701/200 |
| 6,507,785 | B1 | * | 1/2003 | Stefan et al. ................. 701/210 |
| 6,591,094 | B1 | * | 7/2003 | Bentley ................. 455/405 |
| 6,611,229 | B2 | * | 8/2003 | Muramatsu et al. ... 342/357.07 |
| 6,847,892 | B2 | * | 1/2005 | Zhou et al. ................. 701/213 |
| 6,859,722 | B2 | * | 2/2005 | Jones ................. 701/200 |
| 2002/0027523 | A1 | * | 3/2002 | Muramatsu et al. ... 342/357.07 |
| 2002/0145541 | A1 | * | 10/2002 | Matsui et al. ................. 340/934 |

(Continued)

FOREIGN PATENT DOCUMENTS

| JP | 2000-270125 | 9/2000 |
| JP | 2001-344695 | 12/2001 |
| JP | 2002-133591 | 5/2002 |
| JP | 2002-133592 | 5/2002 |

Primary Examiner—Lester G. Kincaid
Assistant Examiner—Khai Nguyen
(74) Attorney, Agent, or Firm—Fildes & Outland, P.C.

(57) ABSTRACT

A system for receiving report from a cellular phone upon arrival at a predetermined destination and at least one passing point, and for displaying the received information on a monitor panel of a monitoring center comprises a cellular phone 2 for receiving and transmitting information via a communication line 4, and a monitoring center 5. The cellular phone 2 is equipped with a function of transmitting a monitoring ID, receiving map information and setting the same, and automatically reporting the arrival at the predetermined passing points A, B, C and the destination D when the arrival is detected by a position detecting unit. The monitoring center 5 is equipped with a function of receiving the monitoring ID from the cellular phone 2 and storing the same in a DB 9, transmitting a map information and displaying the same on a monitor panel, and receiving reports provided with the monitoring ID upon arrival at the predetermined destination or the passing point and displaying the same on the above-mentioned map information on the monitor panel 8.

6 Claims, 6 Drawing Sheets

U.S. PATENT DOCUMENTS

| | | | |
|---|---|---|---|
| 2002/0152028 A1 * | 10/2002 | Motoyama et al. | 701/213 |
| 2002/0161519 A1 * | 10/2002 | Mori et al. | 701/210 |
| 2003/0013449 A1 * | 1/2003 | Hose et al. | 455/440 |
| 2003/0023377 A1 * | 1/2003 | Chen et al. | 701/213 |
| 2004/0119609 A1 * | 6/2004 | Solomon | 340/928 |
| 2004/0174260 A1 * | 9/2004 | Wagner | 340/568.1 |

* cited by examiner

AUTOMATIC REPORT CONTROL SYSTEM FOR REPORTING ARRIVAL AT DESTINATION OR PASSING POINT

FIELD OF THE INVENTION

The present invention relates to an automatic report control system for automatically reporting the arrival of a vehicle at a destination and at least one passing point, so as to secure the safety of travel of a vehicle equipped with a cellular phone utilizing GPS.

DESCRIPTION OF THE RELATED ART

Conventionally, a system that allows cars etc. to obtain current positional data with high accuracy using GPS satellites has been used in a car navigation system and the like. Recently, a service is provided that enables cellular phone users to obtain current positional data using the GPS satellites.

SUMMARY OF THE INVENTION

The present invention aims at providing an automatic report control system that enables a monitoring center to monitor the operation status of a vehicle equipped with a cellular phone utilizing GPS (for example, a cash delivery truck), by receiving reports automatically output from the vehicle upon arrival at predetermined passing points and destination, and also by receiving reports automatically output when an emergency occurs during the operation.

In order to solve the problem, the present invention provides an automatic report control system comprising a cellular phone for receiving and transmitting information via a communication line and a monitoring center for reporting arrival at a destination and at least one passing point:

said cellular phone having at least a position detecting unit for detecting a current location, a setup unit for setting the destination and at least one passing point, a setup unit for setting a telephone number and a mail address of the report destination, a transmission control unit of said telephone number and said mail address used for reporting, and a display unit that enables display of image data such as map information and the like, the cellular phone further provided with a function of transmitting a monitoring ID to the monitoring center, receiving a route information (map information including the destination and at least one passing point) from the monitoring center and setting up the route information, a function of setting the telephone number and the mail address used for reporting arrival at the destination and the passing point, and a function of automatically transmitting a report together with the monitoring ID to the predetermined telephone number or the mail address used for reporting when the position detecting unit detects arrival at the predetermined destination and the passing point; and said monitoring center comprising at least a control server, a monitor panel and a database (hereinafter referred to as DB), the monitoring center further provided with a function of receiving the monitoring ID from the cellular phone and storing the received information in the DB, a function of transmitting the route information to the cellular phone and displaying the same on the monitor panel, and a function of receiving the report with the monitoring ID notifying arrival at the predetermined destination and the passing point and displaying the received information on the route information indicated on the monitor panel.

Also, the cellular phone is provided with a function of detecting the position of the cellular phone upon occurrence of an emergency and automatically transmitting are port provided with the monitoring ID reporting occurrence of the emergency to the monitoring center; and the monitoring center comprises an alarm device, and is provided with a function of receiving the report with the monitoring ID reporting occurrence of the emergency from the cellular phone, displaying received information on the route information on the monitor panel and setting off an alarm sound.

Further, the present invention provides an automatic report control system comprising a monitoring center at least provided with a control server, a monitor panel and a database (DB) for reporting arrival at a destination or at least one passing point, by receiving and transmitting information to and from a cellular phone via a communication line;

wherein the monitoring center further comprises a function of receiving a monitoring ID from the cellular phone and storing the information in the DB, a function of transmitting a route information to the cellular phone and displaying the route information on the monitor panel, and a function of receiving a report with the monitoring ID on arrival at the predetermined destination and passing point and displaying the report on the route information on the monitor panel.

Also, the monitoring center is comprised of an alarm system, and is provided with a function of receiving a report provided with the monitoring ID reporting occurrence of an emergency from the cellular phone, displaying the report on the route information on the monitor panel, and setting off an alarm sound.

Further, the DB of the monitoring center is provided with a function of storing the route information, estimated arrival time at and/or departure time from the predetermined destination or the passing point, time of arrival at and/or departure from the predetermined destination or the passing point, and the telephone number and the mail address used for reporting.

Also, the cellular phone is mounted on a vehicle, and the monitoring center is provided with a function of monitoring the operation status of the vehicle.

Further, the monitoring center is provided with a function of receiving a report on arrival at and/or departure from the destination and the passing point as operation information of the vehicle, and displaying the report on the monitor panel.

Still further, the monitoring center is provided with a function of receiving the report from the cellular phone on the operation status of the vehicle, and indicates the current position of the vehicle on the monitor panel.

DETAILED DESCRIPTION OF PREFERRED EMBODIMENTS

The preferred embodiment of the present invention will now be explained herein below based on examples and with reference to the accompanying drawings.

Figure 1:
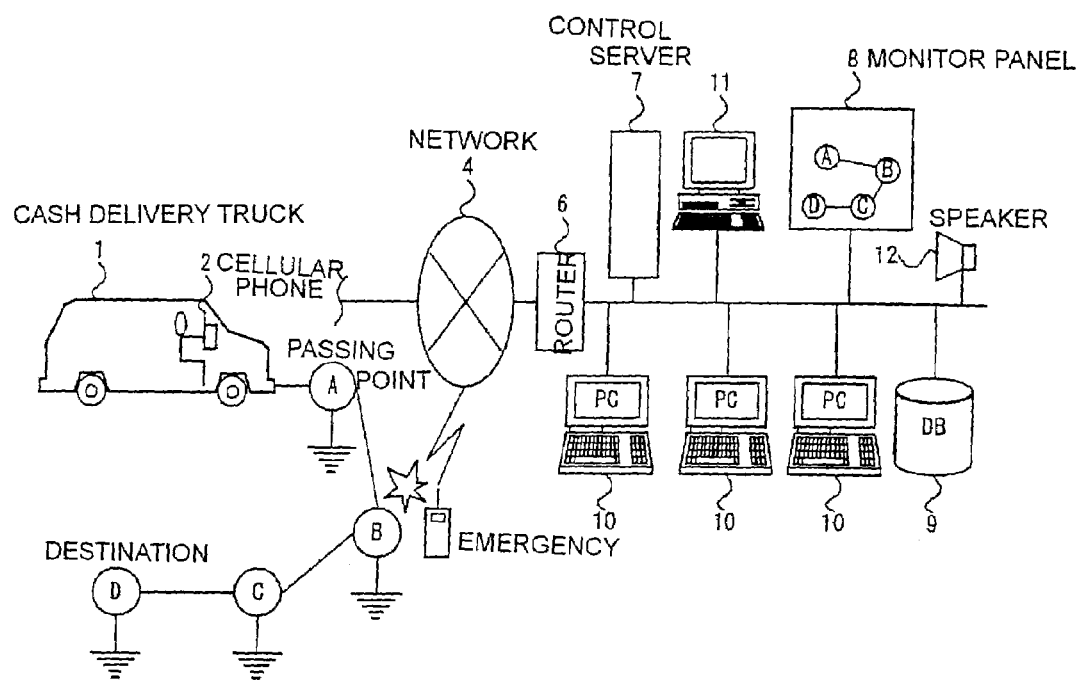
FIG. 1 is an explanatory view of the automatic report control system according to the present invention.
Figure 2:
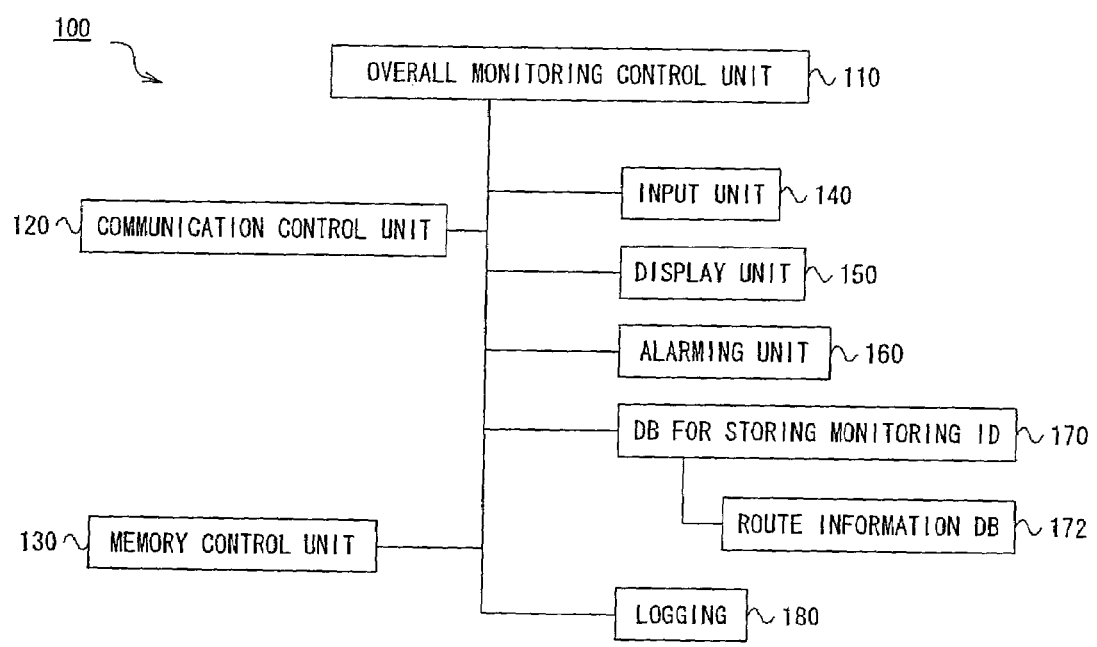
FIG. 2 is a block diagram of the structure of the monitoring center of the automatic report control system.

FIG. 1 is an explanatory view of an automatic report control system for reporting arrival at a destination or at least one passing point utilizing a cellular phone mounted on a vehicle, FIG. 2 is a block diagram explaining the structure of a monitoring center in the automatic report control system mentioned above, FIG. 3 is a block diagram explaining the structure of the cellular phone applicable in the automatic report control system mentioned above, and FIGS. 4 through 6 are flow charts indicating the processes by the cellular phone or the monitoring center.

In FIG. 1, reference number 1 is a vehicle (for example, a cash delivery truck), 2 is a cellular phone equipped with a function of detecting the current position using GPS, and 5 is a monitoring center equipped with a router 6, a control server 7, a monitor panel 8, a database (hereinafter abbreviated as DB) 9, personal computers (hereinafter abbreviated as PC) 10, an alert device 11, a speaker 12 and so on. Data are transmitted between the monitoring center 5 and the cellular phone 2 via a communication network 4.

The control server 7 controls the whole automatic report control system of the present invention. The monitor panel 8 displays the predetermined route of the vehicle, and indicates the operation status of the vehicle by lighting the area representing point A when the system receives a report notifying arrival at point A. 6

The DB 9 stores data such as monitoring ID, route information (map information including the passing points and the destination), estimated time of arrival and estimated time of departure, telephone number and mail address used for reporting, and the like.

The monitoring center monitors the monitoring ID of the cellular phone, initiation data of monitoring, route information (map information including the passing points and the destination), departure time of each point, display of the departed points and the present position, display of the emergency report, and the like.

The cash delivery truck arrives at destination D via passing points A, B and C. When the cash delivery truck reaches each point, the information is automatically reported to the monitoring center 5 from the cellular phone 2. Upon receiving this automatic report, the monitoring center 5 records the data in DB 9 and lightens the area on the monitor panel 8 corresponding to the location point.

For instance, when an emergency occurs at the passing point B, the cellular phone 2 automatically reports the situation to the monitoring center 5. Upon receiving the emergency report, the monitoring center 5 displays the emergency report on the monitor panel and notifies occurrence of the emergency through a speaker 12. Then, necessary action corresponding to the emergency is taken.

The present invention is not limited to monitoring the operation status of a vehicle equipped with a cellular phone, but is also applicable to the case for tracking the movement of the cellular phone user.

In FIG. 2 showing the block diagram of the structure of the monitoring center 5, reference number 110 is an overall monitoring control unit, 120 is a communication control unit for transmitting data to and receiving data from other machines, 130 is a memory control unit, 140 is an input unit, 150 is a display unit (display panel 8), 160 is an alarming unit, 170 is a data base (DB) for storing monitoring ID, 172 is a route information DB, and 180 is a logging.

Figure 3:
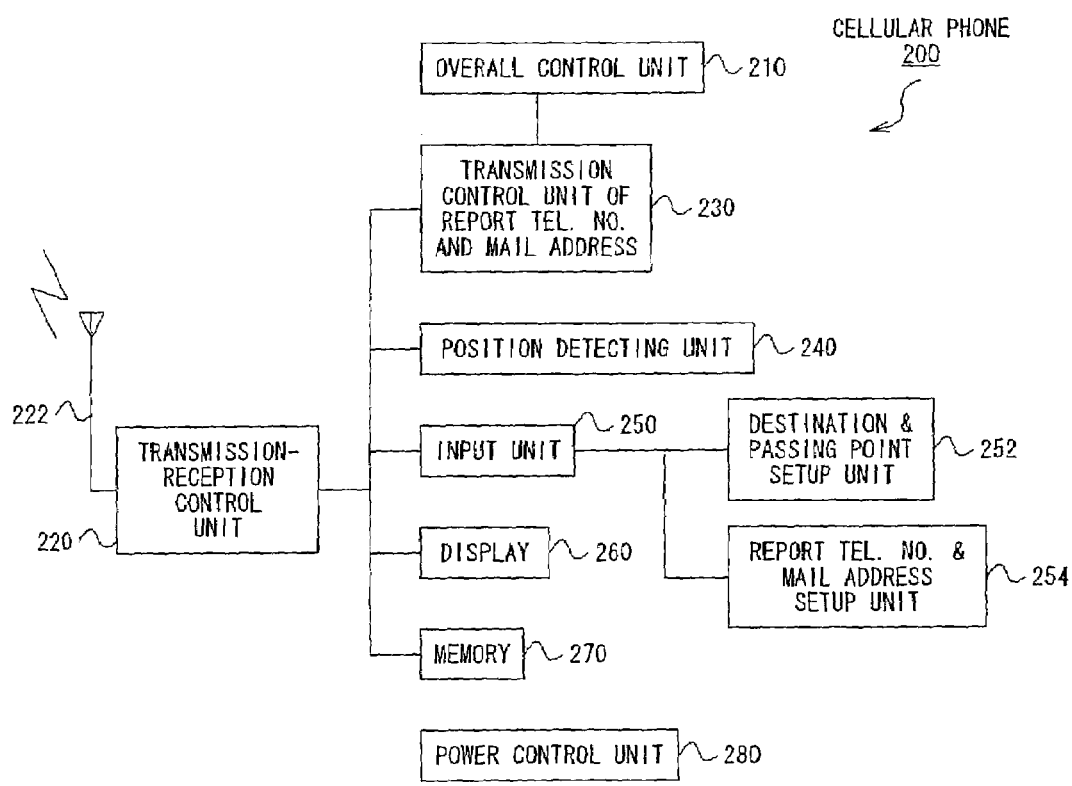
FIG. 3 is a block diagram of the structure of the cellular phone applicable to the automatic report control system.

FIG. 3 is a block diagram showing the configuration of the cellular phone used in the automatic report control system of the present invention. The cellular phone 200 is equipped with an overall control section 210 which controls the cellular phone as a whole. A transmission-reception control unit 220 communicates with other machines via an antenna 222.

A position detecting unit 240 is equipped with a function of detecting the current position by receiving radio signals from a plurality of GPS satellites, or radio signals from at least one GPS satellite and at least one GPS station.

An input unit 250 is equipped with a setup unit 252 for presetting the destination and the passing points, and a setup unit 254 for presetting the telephone number and the mail address used for reporting.

A transmission control unit 230 of the telephone number and the mail address used for reporting controls transmission to the predetermined telephone number and the mail address used for reporting.

A display unit 260 is also capable of displaying image data such as map information and the like, and displays the received route information (map information including the destination and the passing points). A memory 270 stores the set data and the like. A power control unit 280 provides necessary electric power to the entire cellular phone.

Also, it is equipped with a function of detecting the location and automatically reporting the occurrence of emergency to the monitoring center in case of an emergency.

Figure 4:
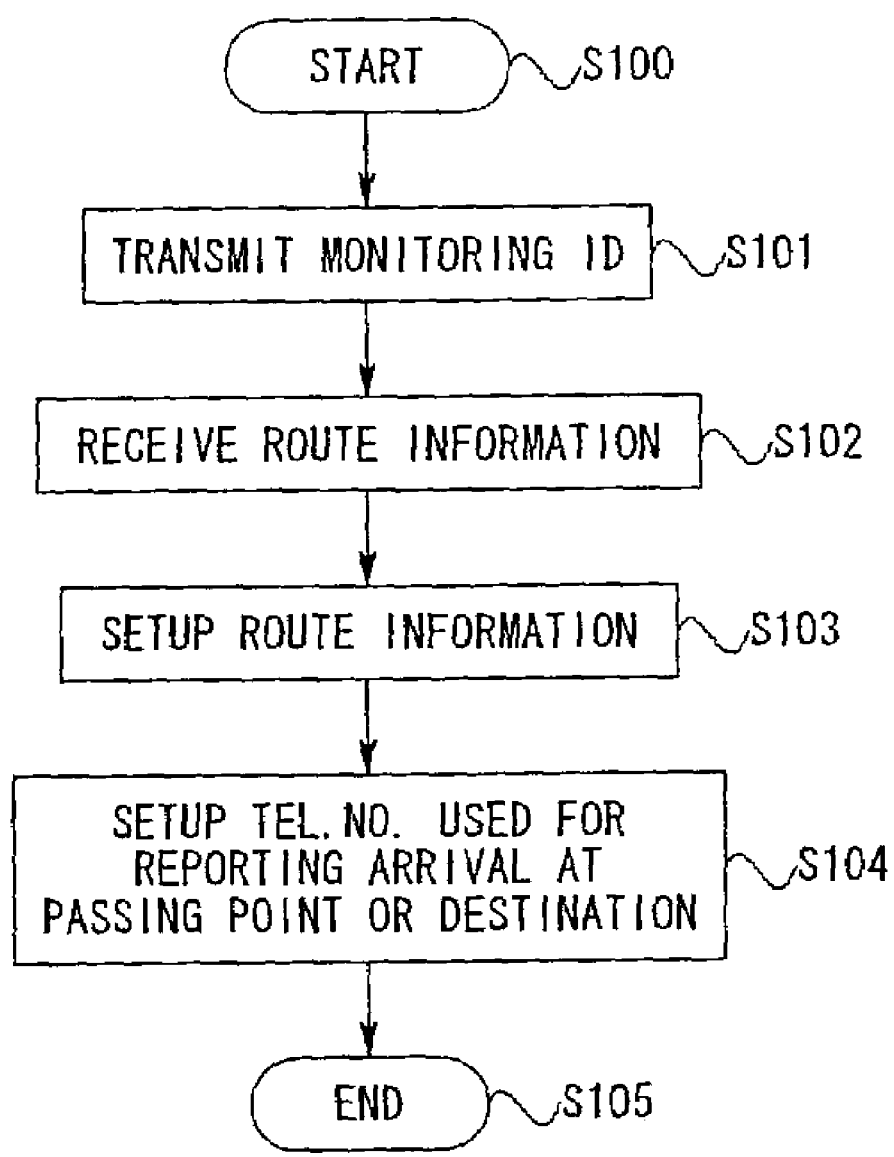
FIG. 4 is a flowchart of the initial process of the cellular phone provided to a vehicle.

FIG. 4 is a flow chart indicating the initial process of the cellular phone equipped to the cash delivery truck 1.

The process starts at step S100. The monitoring ID of the cash delivery truck is transmitted to the monitoring center in step S101. The route information (map information) is received from the monitoring center in step S102, which is downloaded and set as the route information in step S103. The telephone number or the mail address used for reporting the arrival at one of the passing points or the destination is set in step S104. The initial process is completed in step S105.

Figure 5:
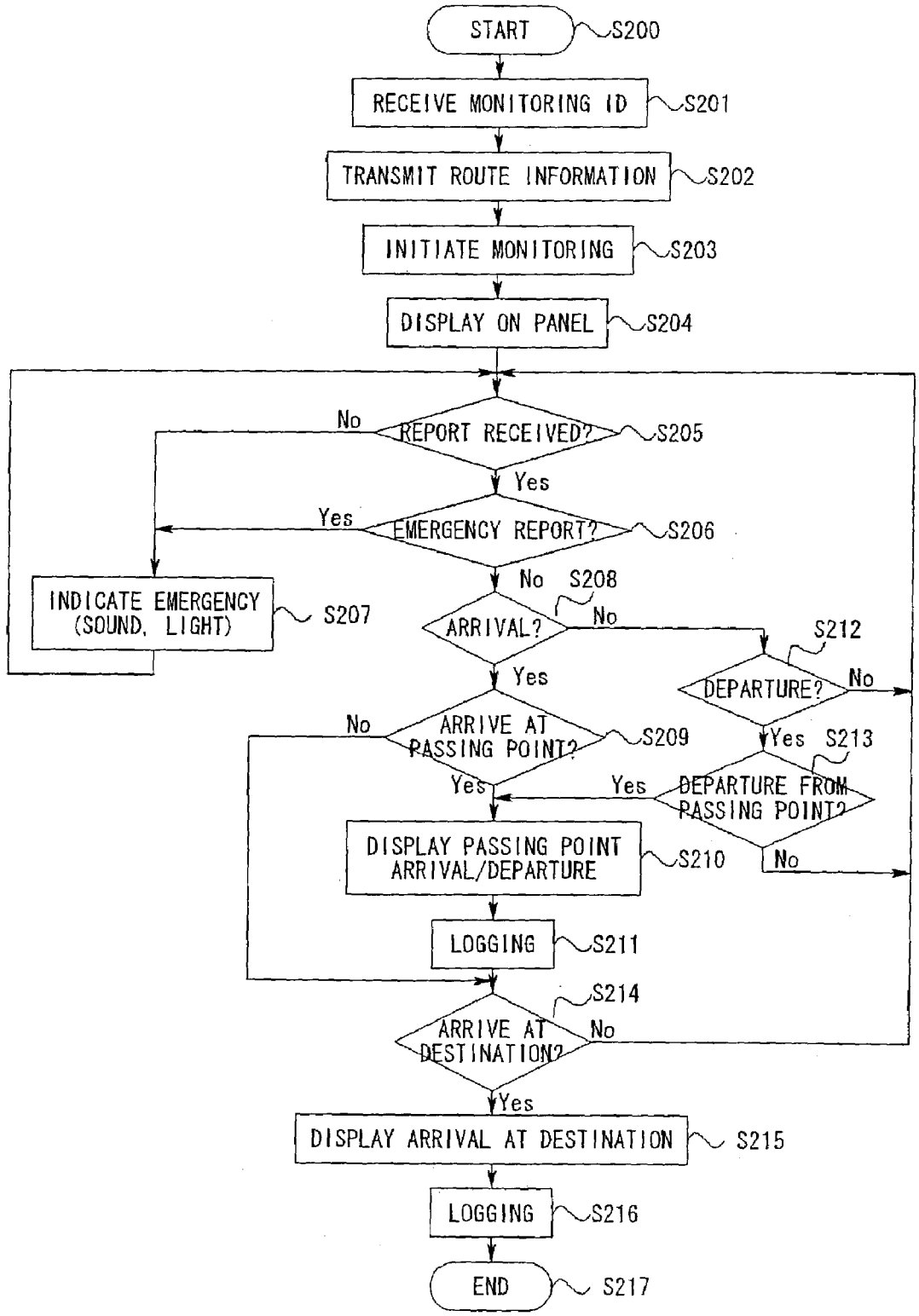
FIG. 5 is a flowchart of the process of the automatic report control system in the monitoring center.

FIG. 5 is a flow chart indicating the process of the automatic report control system in the monitoring center.

The process starts in step S200. The monitoring ID from the cellular phone is received in step S201. The map including the destination and the passing points is transmitted as the route information to the cellular phone in step S202, and the monitoring is commenced in step S203. The route information including the destination and the passing points is displayed on the monitor panel in step S204. The reports during operation (positional data of the passing points and the destination, arrival and departure data to and from these locations, and data in case of occurrence of emergency and the like) provided with the monitoring IDs are automatically transmitted to the monitoring center from the cash delivery truck via the cellular phone. The receipt of such report is checked in step S205. If the report is not received yet, the system waits for the report. If the report is received, then it checks whether the report is an emergency report or not in step S206.

If the received report is an emergency report, the occurrence of an emergency is displayed on the monitor panel 8 and an alarm is set off from the speaker 12 in step S207, and the process returns to step S205. If the received report is not an emergency report, then it is checked in step S208 whether the received report is an arrival report. If it is an arrival report, then in step S209 it is checked whether the arrival report reports the arrival to one of the passing points. If this is true, the arrival to the corresponding passing point is displayed on the monitor panel 8 in step S210, and is recorded in step S211. If the report checked in S208 is not an arrival report, then it is checked instep S212 whether it is a departure report. If it is a departure report, then it is checked in step S213 whether it reports the departure from one of the passing points. If this is true, then the departure from the corresponding passing point is displayed on the monitor panel in step S210, and is recorded in step S211. If the report checked in step S209 is not an arrival report to the passing point, then the process skips to step S214. If the report checked in step S212 is not a departure report, then the process returns to step S205. The received report is checked whether it is an arrival report to the destination in step S214. If not, then the process returns to step S205. If it is an arrival report to the destination, then the arrival to the destination is displayed on the monitor panel in step S215, is recorded in step S216, and the process is completed in step S217.

Figure 6:
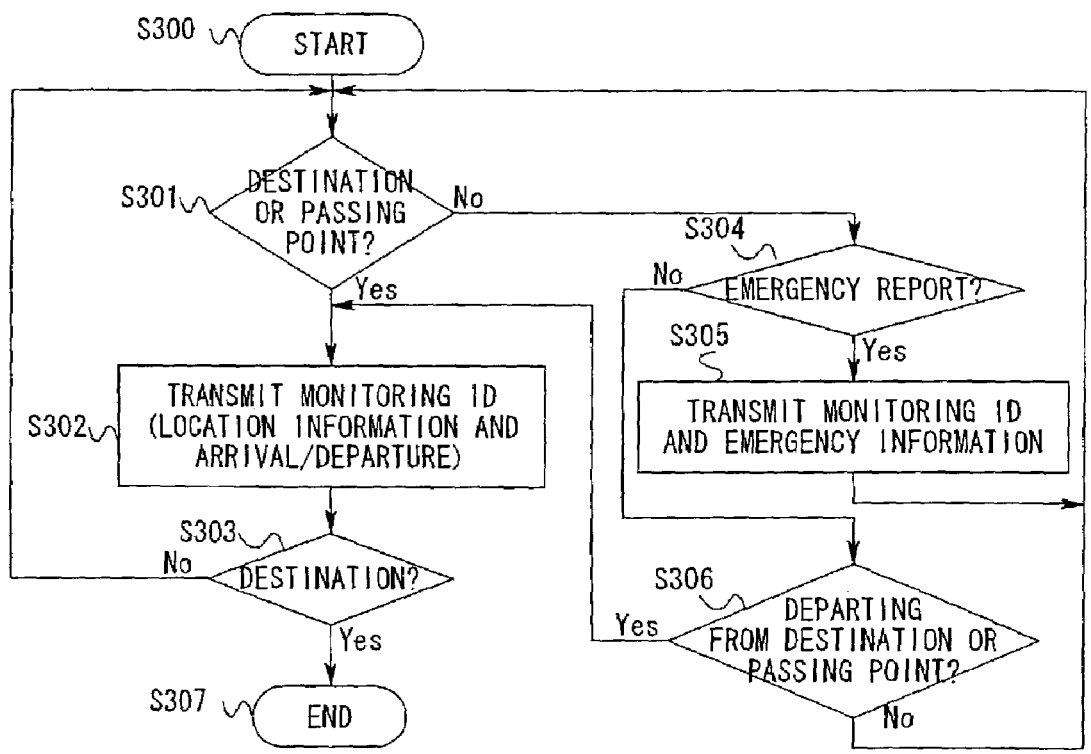
FIG. 6 is a flow chart of the process by the cellular phone in an operating vehicle.

FIG. 6 is a flow chart indicating the process by the cellular phone inside the moving cash delivery truck.

The process starts at step S300. In step S301, it is judged whether the current position is the destination or one of the passing points. If this is true, then the cellular phone automatically transmits the passing point information and the arrival or departure information together with the monitoring ID to the monitoring center in step S302. In step S303, it is judged whether the cash delivery truck has reached the destination or not. If it is false, the process returns to step S301.

If the judgment in step S301 is No, then it is judged whether the report is an emergency report or not in step S304. If it is an emergency report, then the cellular phone automatically transmits the emergency information provided with the monitoring ID in step S305, and the process returns to step S301. If it is not an emergency report, then it is judged whether the vehicle is departing from the destination or from one of the passing points in step S306. If the vehicle is departing, then the process returns to step S302. If the vehicle is not departing, then the process returns to step S301. If the decision in step S303 is Yes, then the process is completed in step S307.

Heretofore, the case for automatically transmitting the current positional data to the monitoring center upon arriving at and/or departing from the predetermined passing points and the destination has been explained. However, the present invention is not limited to this example and may be applied to the case where the current positional data is automatically obtained, and automatically transmitted to the monitoring center together with the monitoring ID upon receiving a request from the monitoring center. Moreover, the present invention may be applied to the case where the current positional data is automatically obtained, and automatically transmitted together with the monitoring ID to the monitoring center when a person using the cellular phone operates the function of obtaining the current positional data at an arbitrary point.

The automatic report control system of the present invention transmits to the monitoring center a report together with the monitoring ID on arrival at an arbitrary point or at one of the predetermined passing points or the destination from a vehicle or a person having the cellular phone equipped with a function of detecting the current position, or during occurrence of an emergency, and the monitoring center receives such reports, displays the received information on the map on the monitor panel, and sets off an alarm.

According to the automatic report control system of the present invention, the arrival at the destination or the passing points by a moving vehicle or a person unfamiliar with the surroundings, or a child and the like, may easily be tracked. Moreover, the system according to the present invention improves safety of travel, and enables to take necessary measures when an emergency occurs during the travel.

What is claimed is:

1. An automatic report control system comprising a cellular phone for receiving and transmitting information via a communication line and a monitoring center for reporting arrival at a destination or at least one passing point:

said cellular phone having at least a position detecting unit for detecting a current location, a setup unit for setting said destination and said at least one passing point, a setup unit for setting a telephone number and a mail address of the report destination, a transmission control unit of said telephone number and said mail address used for reporting, and a display unit that enables display of image data such as map information and the like, the cellular phone further provided with a function of transmitting a monitoring ID to said monitoring center, receiving a route information from said monitoring center and setting up said route information, a function of setting said telephone number and said mail address used for reporting arrival at said destination and said at least one passing point, and a function of automatically transmitting a report provided with said monitoring ID to said predetermined telephone number or said mail address used for reporting when said position detecting unit detects arrival at said predetermined destination and the passing point; and said monitoring center comprising at least a control server, a monitor panel and a database (hereinafter referred to as DB), the monitoring center further provided with a function of receiving said monitoring ID from said cellular phone and storing the received information in said DB, a function of transmitting said route information to said cellular phone and displaying the same on said monitor panel, and a function of receiving said report together with said monitoring ID notifying arrival at said predetermined destination and said at least one passing point and displaying the received information on said route information indicated on said monitor panel.

2. An automatic report control system according to claim 1, wherein:

said cellular phone is further provided with a function of detecting the position of said cellular phone upon occurrence of an emergency and automatically transmitting a report together with said monitoring ID reporting occurrence of said emergency to the monitoring center; and said monitoring center further comprises an alarm device, and is further provided with a function of receiving said report together with said monitoring ID reporting occurrence of said emergency from said cellular phone, displaying received information on said route information on said monitor panel and setting off an alarm sound.

3. An automatic report control system for reporting arrival at a destination or at least one passing point according to claim 1, wherein said DB of said monitoring center is further provided with a function of storing said route information, estimated arrival time at and/or estimated departure time from said predetermined destination or said at least one passing point, time of arrival at and/or departure from said predetermined destination or said at least one passing point, and said telephone number and said mail address used for reporting.

4. An automatic report control system for reporting arrival at a destination or at least one passing point according to claim 1, wherein said cellular phone is mounted on a vehicle, and said monitoring center is further provided with a function of monitoring the operation status of said vehicle.

5. An automatic report control system for reporting arrival at a destination or at least one passing point according to claim 1, wherein said cellular phone is mounted on a vehicle; and
said monitoring center is provided with a function of monitoring the operation status of said vehicle, receiving a report on arrival at and/or departure from said destination and said at least one passing point as an operation information of said vehicle, and displaying said report on said monitor panel.

6. An automatic report control system for reporting arrival at a destination or at least one passing point according to claim 1, wherein said cellular phone is mounted on a vehicle; and
said monitoring center is provided with a function of monitoring the operation status of said vehicle, receiving a report from said cellular phone on the operation status of said vehicle, and indicating the current position of said vehicle on said monitor panel.

* * * * *